(12) United States Patent
Chapman et al.

(10) Patent No.: US 7,967,230 B2
(45) Date of Patent: Jun. 28, 2011

(54) KITCHEN TOOL

(75) Inventors: Dean Chapman, Montclair, NJ (US);
Paul Goetz, Astoria, NY (US); Garoth Brown, Jersey City, NJ (US); Ed Kilduff, New York, NY (US)

(73) Assignee: Freshlink Product Development, LLC, New York, NY (US)

( * ) Notice: Subject to any disclaimer, the term of this patent is extended or adjusted under 35 U.S.C. 154(b) by 0 days.

(21) Appl. No.: 12/484,242

(22) Filed: Jun. 14, 2009

(65) Prior Publication Data

US 2009/0308962 A1 Dec. 17, 2009

Related U.S. Application Data

(60) Provisional application No. 61/061,637, filed on Jun. 15, 2008.

(51) Int. Cl.
*A47J 43/00* (2006.01)

(52) U.S. Cl. .................................................. 241/169.2

(58) Field of Classification Search ................ 241/169.2
See application file for complete search history.

(56) References Cited

U.S. PATENT DOCUMENTS

| 1,353,520 A * | 9/1920 | Defenbaugh .............. 241/169.2 |
| 2009/0236454 A1 * | 9/2009 | Schmidt ..................... 241/169.2 |

* cited by examiner

*Primary Examiner* — Mark Rosenbaum
(74) *Attorney, Agent, or Firm* — White-Welker & Welker, LLC

(57) ABSTRACT

The kitchen tool is composed of: a handle, a support yoke, and a crushing plate. The handle is connected to the support yoke. The support yoke is shaped to form a parabolic arch with arms that are biased to spring inward or outward in an alternative embodiment. The end of each arm has a mounting hole along with three locking holes. These pivot axles are connected to the mounting holes on the support yoke arms. The holes and posts are arranged such that they for two positions for the device. In a first position the crushing plate is place is a position perpendicular to the support yoke arms. In a second position the crushing plate is place is a position parallel to the support yoke which makes the device's profile much thinner and easier to fit into a standard kitchen drawer.

17 Claims, 5 Drawing Sheets

KITCHEN TOOL

CROSS REFERENCE TO RELATED APPLICATIONS

This application claims priority from U.S. Provisional Patent Application Ser. No. 61/061,637, entitled "Masher Device", filed on 15 Jun. 2008. The benefit under 35 USC §119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention relates generally to cooking and kitchen devices. More specifically, the present invention relates to a cooking and kitchen device for mashing potatoes or other food items.

BACKGROUND OF THE INVENTION

The problem with most crushing devices of this nature found on the market now and known in the prior art is that they are bulky and difficult to store. To that end, the present invention describes a crushing and/or mashing device which folds flat for easy storage.

SUMMARY OF THE INVENTION

The present invention is for a device for crushing and mixing potatoes and other food items prior to consumption. The masher is composed of: a handle, molded from plastic of other suitably strong material; a support yoke, made from steel or other suitably strong material; and a crushing plate made from steel or other suitably strong material.

The handle is connected to the support yoke. The support yoke is shaped to form a parabolic arch with arms that are biased to spring outward or inward depending on the configuration. The end of each arm has a mounting hole along with four locking holes. The crushing plate is composed of a domed perforated plate with a tab extended to the right and left sides. The domed surface allows for a rocking motion to be used during mashing and makes mashing more effective. The tabs on the crushing plate are folded ninety degrees up to form two symmetric vertical surfaces. On both of these surfaces there is a pivot axle and four locking posts welded, stamped or otherwise formed in place.

These pivot axles are connected to the mounting holes on the support yoke arms. Once connected the two flaps on the crushing plate restrain the support yoke arms from returning to their rest position. This causes a constant outwardly biased force to push the arms of the support yoke against the crushing plate. Because the pivot axles and mounting holes are concentric these parts can rotate freely relative to each other. As these parts rotate the locking posts on the crush plate engage the locking holes on the support arms fixing the arms and crushing plate in place relative to each other.

If the support arms are flexed inward the locking posts will disengage from the locking holes and the crushing plate and arms will rotate freely again. If the support arms are released the support arms will lock again once the locking posts and holes realign. The locking action is strong enough that unless the support arms of the yoke are squeezed to release the lock, the device will not move and will support a large force on the crushing plate.

The holes and posts are arranged such that they allow for two positions for the device. In a first position, shown in FIGS. 1 and 2, the crushing plate is place is a position perpendicular to the support yoke arms. In this position the crushing plate can be used very effectively to crush and process many food items. In a second position, shown in FIGS. 3 and 4, the crushing plate is place is a position parallel to the support yoke. This orientation makes the device's profile much thinner and easier to fit into a standard kitchen drawer.

Therefore is it an objective of the present invention to teach a crushing device which folds flat for easy storage.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

Figure 1:
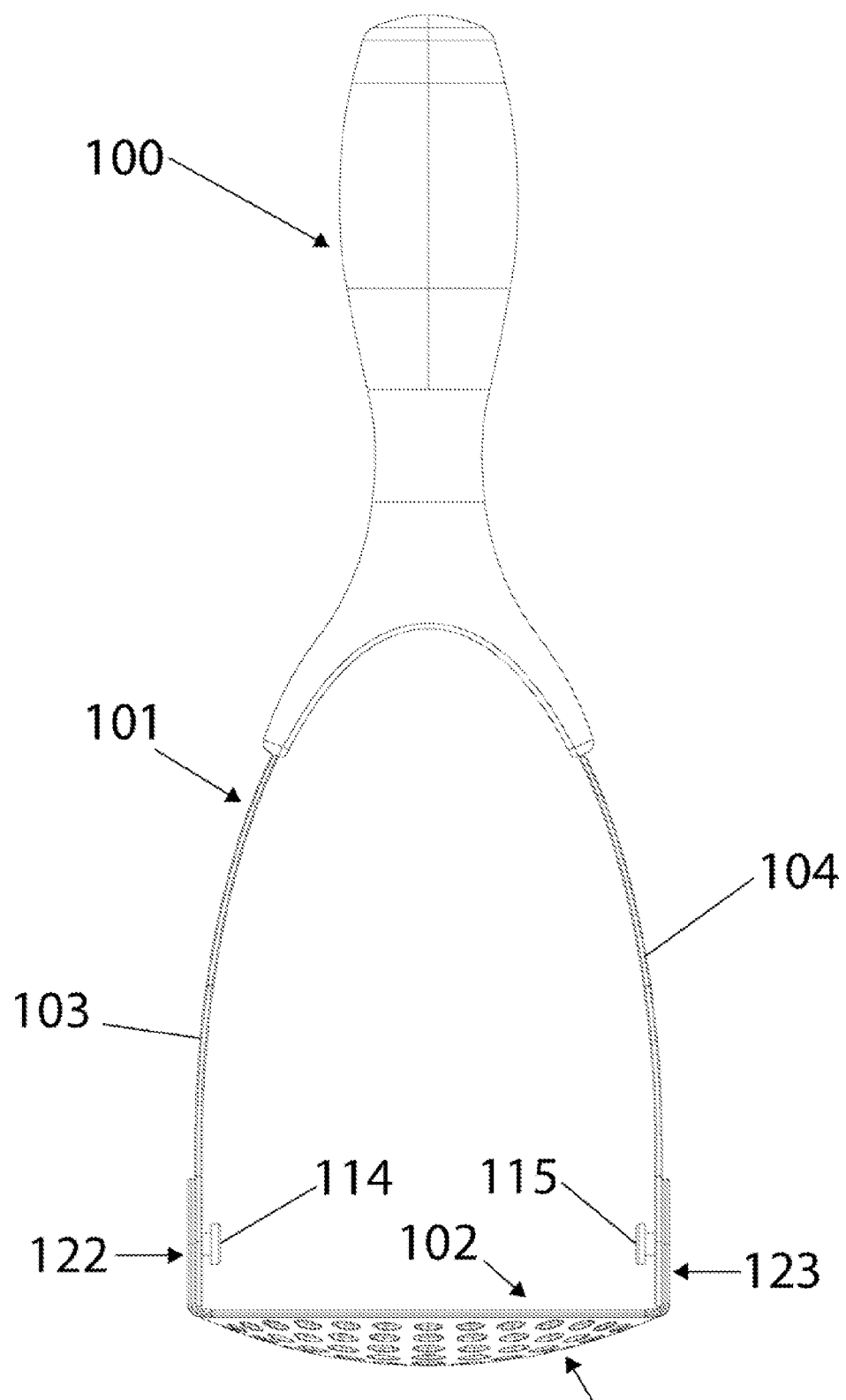
FIG. 1 is a first orthogonal view of the device of the present invention in a first position where the crushing plate is placed perpendicular to the support yoke arms providing means to crush and process many food items.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention.

Referring to the figures, it is possible to see the various major elements constituting the apparatus of the present invention. Now referring to the Figures, the embodiment of the masher device is illustrated. The masher is composed of: a handle 100, from plastic or other suitably strong material; a support yoke 101, made from steel or other suitably strong material; and a crushing plate 102 made from steel or other suitably strong material.

The handle 100 is connected to the support yoke 101. The support yoke 101 is shaped to form a parabolic arch with arms 103 and 104 that are biased to spring outward. The steel material allows these arms 103 and 104 to flex inward and spring back to their resting position. The end of each arm 105 and 106 has a mounting hole 107 and 120 along with four locking holes 108, 109, 110, and 111.

The crushing plate 102 is composed of a domed perforated plate 124 with a tab 112 extended from a first side and an tab 113 extended from the opposite side of the domed perforated plate 124. These tabs 112 and 113 are folded ninety degrees up to form two symmetric vertical surfaces 123 and 122. On both of these surfaces 121 and 122 there is a pivot axle 114 and 115 and four locking posts 116, 117, 118, and 119 welded in place.

These pivot axles 114 and 115 are connected to the mounting holes 107 and 120 on the support yoke arms 103 and 104. Once connected the two tabs 112 and 113 on the crushing plate 102 restrain the support yoke arms 103 and 104 from returning to their rest position. This causes a constant outwardly biased force to push the support yoke arms 103 and 104 against the crushing plate 102. Because the pivot axles 114 and 115 and mounting holes 107 and 120 are concentric these parts can rotate freely relative to each other. As these parts rotate the four locking posts 116, 117, 118, and 119 on the crush plate 102 engage the four locking holes 108, 109, 110, and 111 on the support arms 103 and 104 fixing the support arms 103 and 104 and crushing plate 102 in place relative to each other.

If the support arms 103 and 104 are flexed inward the locking posts 116, 117, 118, and 119 will disengage from the locking holes 108, 109, 110, and 111 and the crushing plate 102 and support arms 103 and 104 will rotate freely again. If the support arms 103 and 104 are released the support arms 103 and 104 will lock again once the locking posts 116, 117, 118, and 119 and holes realign. The locking action is strong enough that unless the support arms 103 and 104 of the support yoke 101 are squeezed in and inward direction toward each other to release the lock, the device will not move and will support a large force on the crushing plate 102.

Figure 2:
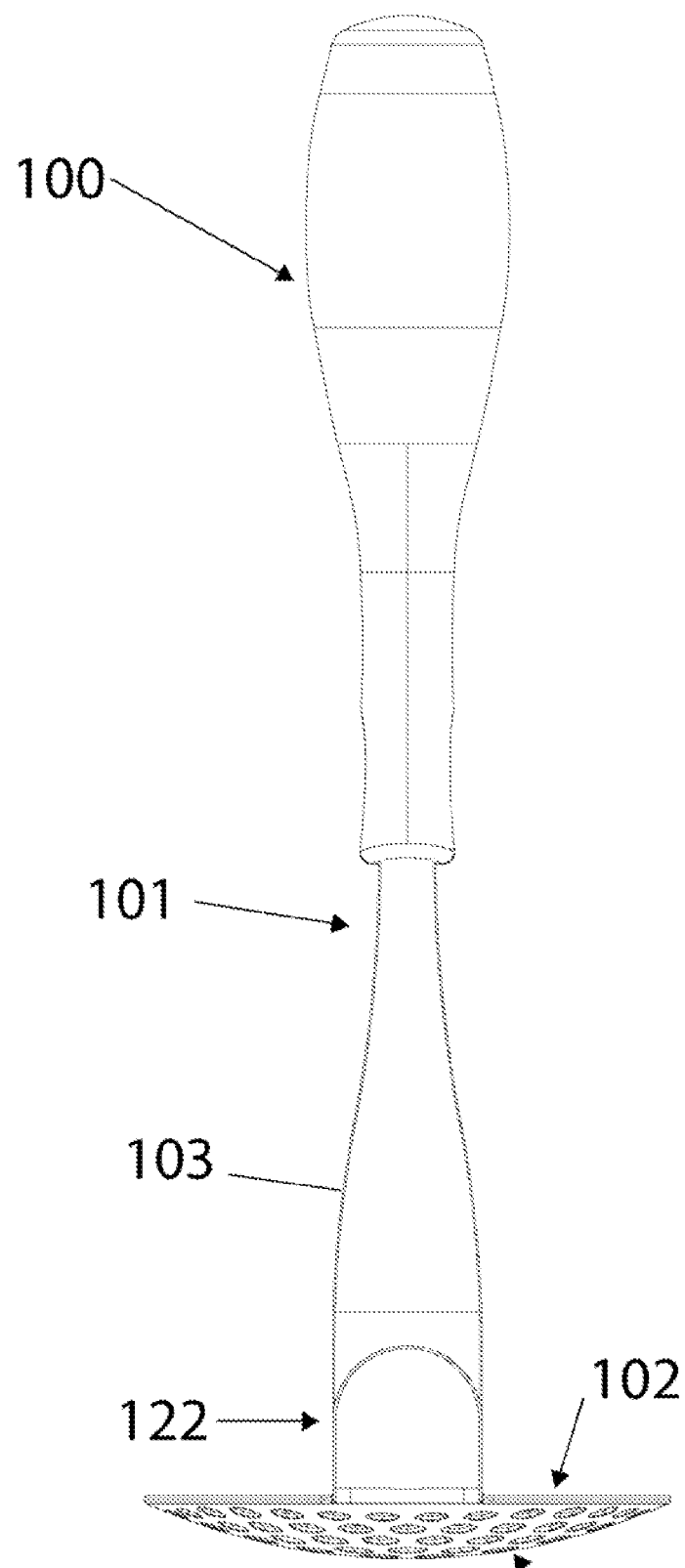
FIG. 2 is a second orthogonal view of the device of the present invention in a first position where the crushing plate is placed perpendicular to the support yoke arms providing means to crush and process many food items.
Figure 3:
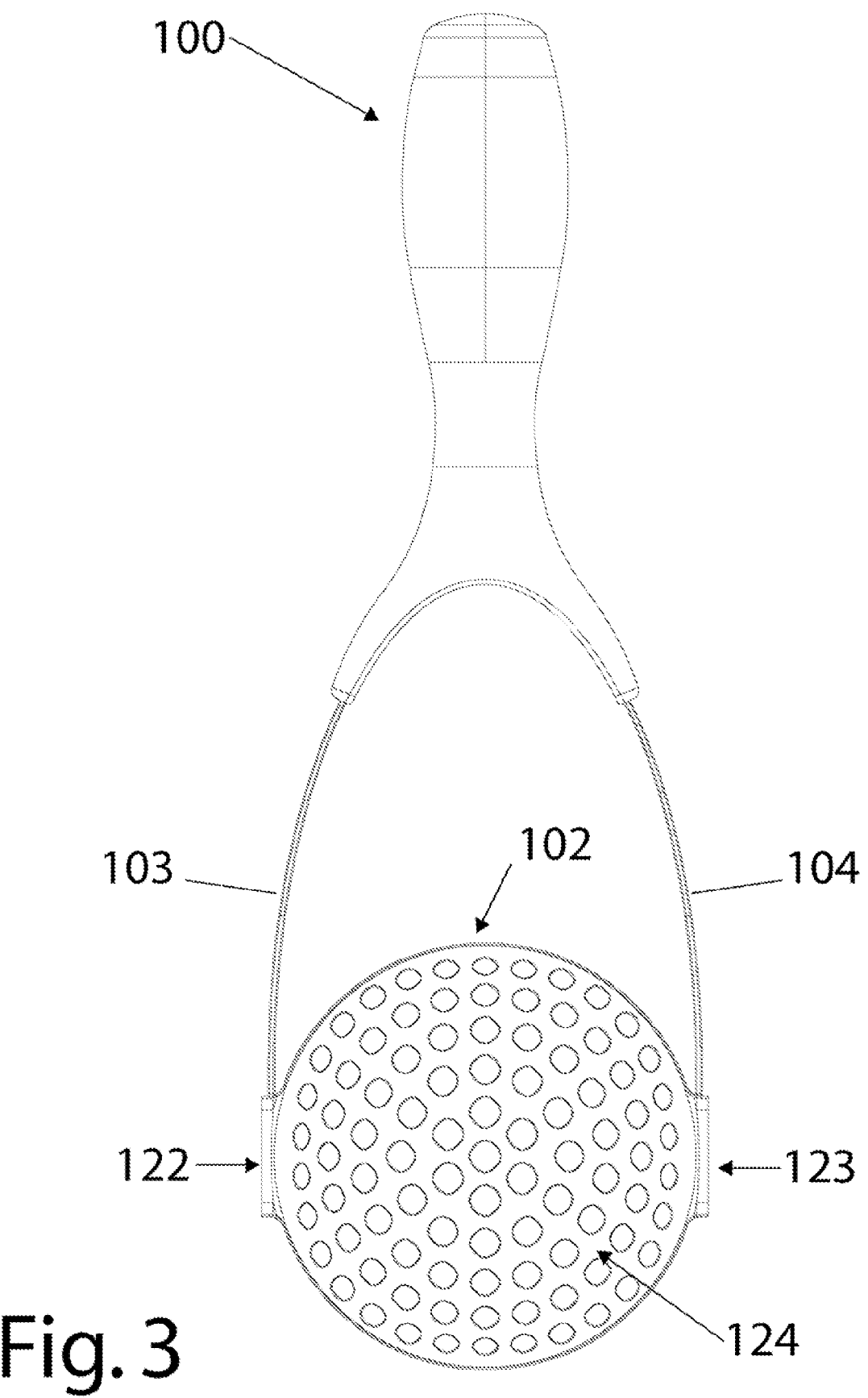
FIG. 3 is a first orthogonal view of the device of the present invention in a second position where the crushing plate is place is a position parallel to the support yoke.
Figure 4:
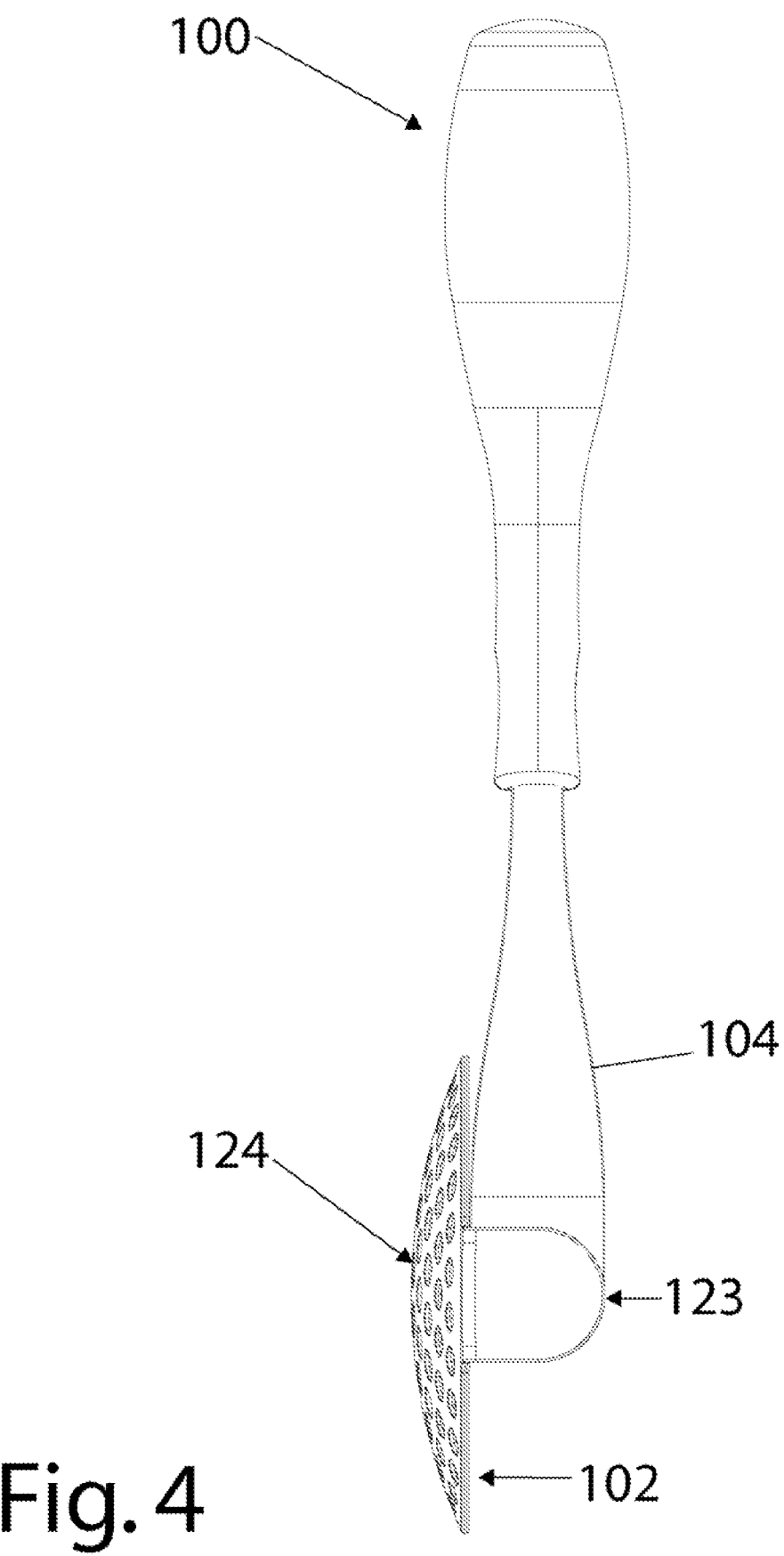
FIG. 4 is a second orthogonal view of the device of the present invention in a second position where the crushing plate is place is a position parallel to the support yoke.
Figure 5:
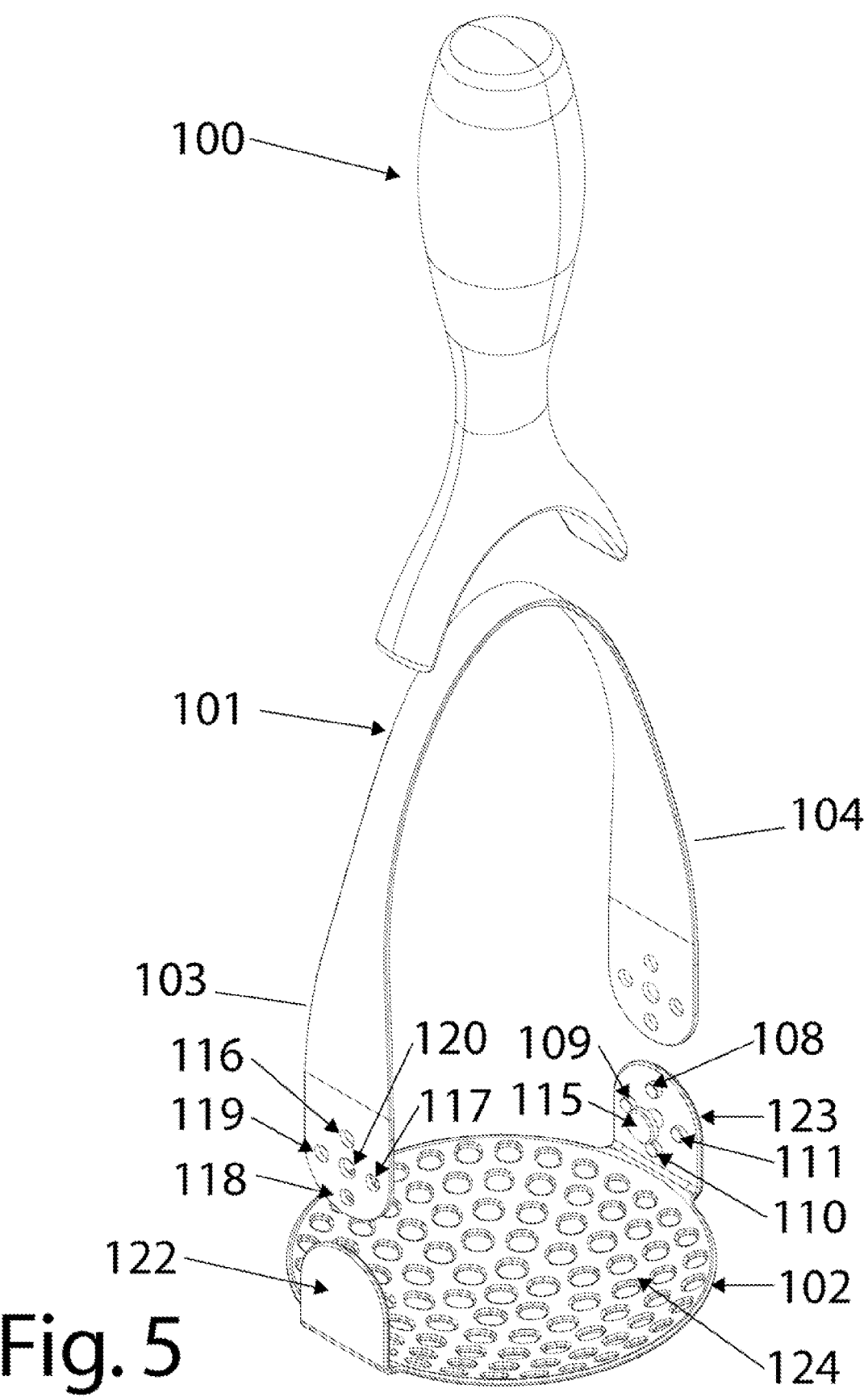
FIG. 5 is an expanded view of the device of the present invention illustrating the component parts of the invention and their relationship in combination to each other.

The four locking holes 108, 109, 110, and 111 and four locking posts 116, 117, 118, and 119 are arranged such that they allow two positions for the device. In a first position, shown in FIGS. 1 and 2, the crushing plate 102 is place is a position perpendicular to the support yoke arms 103 and 104. In this position the crushing plate 102 can be used very effectively to crush and process many food items. In a second position, shown in FIGS. 3 and 4, the crushing plate 102 is placed in a position parallel to the support yoke 101. This orientation makes the device's profile much thinner and easier to fit into a standard kitchen drawer.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A device consisting of the following parts in combination:
- a handle;
- a support yoke; and
- a crushing plate;
- the handle is connected to the support yoke;
- the support yoke is shaped to form a parabolic arch with arms that are biased to spring inward;
- the arms flex inward and spring back to a resting position; and
- the end of each arm has a mounting hole along with a plurality of locking holes;
- the crushing plate is composed of a perforated plate with a tab extended to a first side and a second, opposite side;
- said tabs are folded ninety degrees up to form two symmetric vertical surfaces; and
- on both of these surfaces there is provided a pivot axle and four locking posts.

2. The device of claim 1, wherein
- said pivot axles are connected to the mounting holes on the support yoke arms;
- the two tabs on the crushing plate restrain the support yoke arms from returning to their rest position providing a constant outwardly biased force to push the arms of the support yoke against the crushing plate;
- said pivot axles and mounting holes are concentric and can rotate freely relative to each other; and
- as said pivot axles and mounting holes rotate the locking posts on the crush plate engage the locking holes on the support arms fixing the arms and crushing plate in place, relative to each other.

3. The device of claim 2, wherein
- when the support arms are flexed inward the locking posts will disengage from the locking holes and the crushing plate and arms will rotate freely again; and
- when the support arms are released the support arms will lock again once the locking posts and holes realign.

4. The device of claim 2, wherein
- the holes and posts are arranged such that they provide two positions for the device;
  - in a first position the crushing plate is placed perpendicular to the support yoke arms providing means to crush and process many food items;
  - in a second position, s the crushing plate is placed parallel to the support yoke providing means to make the device's profile thinner.

5. The device of claim 2, wherein the end of each arm has a mounting hole along with three locking holes.

6. The device of claim 2, wherein the end of each arm has a mounting hole along with four locking holes.

7. The device of claim 2, wherein
- the handle is molded from plastic or other suitably strong material;
- the support yoke is made from steel or other suitably strong material; and
- the crushing plate is made from steel or other suitably strong material.

8. The device of claim 1, wherein the crushing plate is composed of a domed perforated plate with a tab extended to a first side and a second, opposite side.

9. The device of claim 1, wherein the crushing plate is composed of a flat perforated plate with a tab extended to a first side and a second, opposite side.

10. A device consisting of the following parts in combination:
- a handle;
- a support yoke; and
- a crushing plate;
- the handle is connected to the support yoke;
- the support yoke is shaped to form a parabolic arch with arms that are biased to spring outward;
- the arms flex outward and spring back to a resting position; and
- the end of each arm has a mounting hole along with a plurality of locking holes;
- the crushing plate is composed of a domed perforated plate with a tab extended to a first side and a second, opposite side;
- said tabs are folded ninety degrees up to form two symmetric vertical surfaces;
- on both of these surfaces there is provided a pivot axle and four locking posts;
- said pivot axles are connected to the mounting holes on the support yoke arms; and
- the two tabs on the crushing plate restrain the support yoke arms from returning to their rest position providing a constant outwardly biased force to push the arms of the support yoke against the crushing plate;
- said pivot axles and mounting holes are concentric and can rotate freely relative to each other;
- as said pivot axles and mounting holes rotate the locking posts on the crush plate engage the locking holes on the support arms fixing the arms and crushing plate in place, relative to each other.

11. The device of claim 10, wherein
- when the support arms are flexed outward the locking posts will disengage from the locking holes and the crushing plate and arms will rotate freely again; and
- when the support arms are released the support arms will lock again once the locking posts and holes realign.

12. The device of claim 10, wherein
- the holes and posts are arranged such that they provide two positions for the device;
  - in a first position the crushing plate is placed perpendicular to the support yoke arms providing means to crush and process many food items;
  - in a second position, s the crushing plate is placed parallel to the support yoke providing means to make the device's profile thinner.

13. The device of claim 10, wherein the end of each arm has a mounting hole along with three locking holes.

14. The device of claim 10, wherein the end of each arm has a mounting hole along with four locking holes.

15. The device of claim 10, wherein
- the handle is molded from plastic or other suitably strong material;
- the support yoke is made from steel or other suitably strong material; and
- the crushing plate is made from steel or other suitably strong material.

16. The device of claim 10, wherein the crushing plate is composed of a domed perforated plate with a tab extended to a first side and a second, opposite side.

17. The device of claim 10, wherein the crushing plate is composed of a flat perforated plate with a tab extended to a first side and a second, opposite side.

* * * * *